P. CATUCCI.
SPRING MOTOR WINDING SPINDLE.
APPLICATION FILED APR. 26, 1917.
1,270,265.
Patented June 25, 1918.
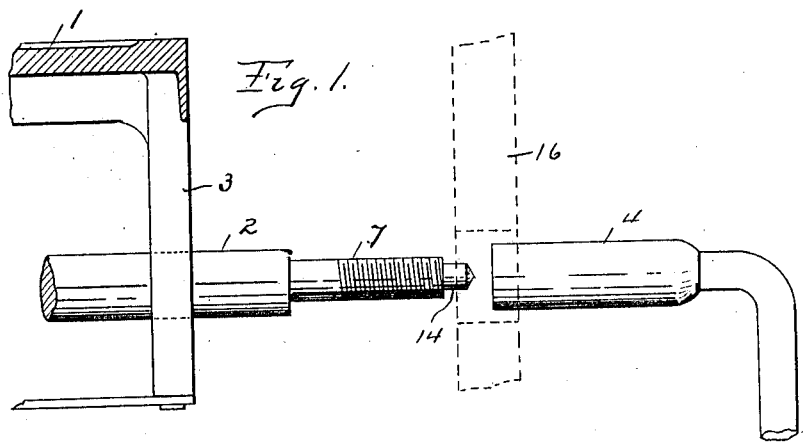
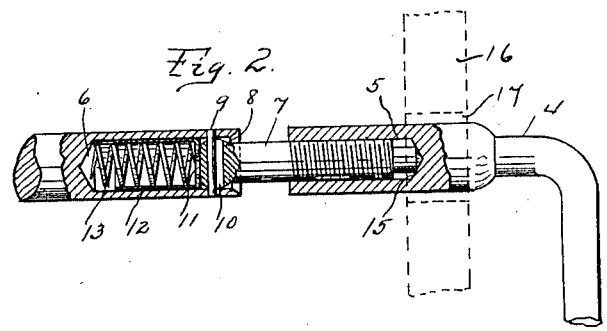
Pliny Catucci   INVENTOR.
BY
Louis M. Sanders, ATTORNEYS.

UNITED STATES PATENT OFFICE.

PLINY CATUCCI, OF NEWARK, NEW JERSEY, ASSIGNOR, BY MESNE ASSIGNMENTS, TO OTTO HEINEMAN PHONOGRAPH SUPPLY CO., INC., OF NEW YORK, N. Y., A CORPORATION OF NEW YORK.

SPRING-MOTOR WINDING-SPINDLE.

1,270,265.

Specification of Letters Patent.

Patented June 25, 1918.

Application filed April 26, 1917. Serial No. 164,594.

*To all whom it may concern:*

Be it known that I, PLINY CATUCCI, a citizen of the United States, residing in the city of Newark, county of Essex, and State of New Jersey, have invented certain new and useful Improvements in Spring-Motor Winding-Spindles, of which the following is a specification.

My invention relates to improvements in talking machine motors and has to do particularly with the winding spindle. In modern practice it is common to suspend the spring motor from the lower side of a board, either square or oblong, which serves the dual purpose of a motor support and an inside cover for the cabinet or case. The winding shaft or spindle projects laterally or horizontally from the motor frame in the direction of an aperture in the side of a cabinet, through which the winding crank is to be inserted and coupled to the winding spindle. Notwithstanding the accuracy of the measurements, and directions given for installing the motor in the cabinet, and although the motor is of a standard pattern it very frequently happens that the motor is not accurately mounted upon the board, or the aperture is not accurately bored through the side of the cabinet, with the result that the winding spindle does not register accurately with the aperture. Under these conditions it is often difficult and sometimes impossible to attach the winding crank to the spindle; and when attached it often binds in the aperture, and in many cases the winding spindle has been so bent and distorted and even broken by an inexperienced operator as to render the entire machine useless. Another serious objection is found in the imperfect alinement of the winding crank with the spindle; this causes a binding in the side aperture, and in many types of machines, a shifting of the motor board either up and down or laterally, unless it is firmly secured in place and then, where there is a screw connection between the crank and spindle a broken spindle naturally follows. This imperfect alinement of crank and spindle may be due to bending under excessive strain in winding, or an accidental blow, or any one of many causes.

I have found that by providing a jointed or flexible connecting end for the spindle I am able to entirely overcome the objectionable strains due to imperfect alinement, and the shifting of the motor board, while winding, is completely avoided.

In the accompanying drawings which illustrate the preferred form of my improvement—

Figure 1 shows a fractional view of so much of a well known standard spring motor as is necessary to fully understand my invention. The winding crank is shown detached, and the relative position of the side of the cabinet is shown in dotted lines.

Fig. 2, is a longitudinal section of the winding spindle with the crank in place.

Similar reference numerals are applied to like parts throughout the specification and drawings.

The motor frame 1, may be of any usual or preferred type, that shown being one of a well known standard make now on the market. A winding spindle 2, is journaled in a bearing stanchion 3, and extends horizontally away from the frame 1, to a distance convenient for the attachment of a winding crank 4. The crank connection shown is the well known screw connection; that is to say, the spindle is provided with a reduced, screw-threaded extension to receive a screw-threaded socket 5, of a crank 4. As above indicated, it has been the usual practice to make this screw threaded extension integral with the spindle. In the present case I provide sprindle 2, with a large socket 6, in its outer end. The extension 7, is provided with a spherical head 8, of a diameter to nicely fit into the socket 6, where it is pivotally secured in place by a pin 9, which passes through a slightly elongated diametrical slot 10, in the head 8, and through the walls of the socket 6. In order to preserve the normal alinement of the axes of the spindle 2, and extension 7, I employ the following means:

The inner part of the head 8, is flattened as at 11. A spring cup 12, and spring 13, are inserted into the socket 6, with the bottom of the cup bearing upon the flattened part 11. The spring 13, bottoms on the inner end of the socket 6, and being under considerable compression, always tends to hold the screw-threaded extension 7, in alinement with the spindle, with the pin 9, at the end of the slot 10. When moved out of alinement in any direction, the spring 13, acting through the cup 12, upon the flattened part 11, of the head 8, has a constant tendency to restore such alinement.

The structure is in effect a sectional winding spindle with a universal joint connecting the sections thereof, and is provided with means for restoring and normally maintaining axial alinement of such sections.

The outer end of the screw extension 7, is provided with a short blunt stud 14, intended to engage the bottom of the socket 15, of the crank 4, to prevent screwing the same too tight.

From the foregoing description it will be readily seen that the extension 7, is maintained in perfect alinement with the spindle 6, and when the crank 4, is in position as shown in Fig. 2, the strains of the crank will be exerted rather upon the wall 16, of the cabinet or more particularly upon the walls of the aperture 17. Moreover any slight discrepancy in the alinement of the spindle 6, with the aperture 17, will not result in any undue strains upon the spindle 6, due to the forcing of the crank socket through the aperture 17, and the screwing of the same home upon the extension 7; for such extension 7, will adjust itself to the position of the aperture 17, and even though such aperture is out of alinement, the universal joint connection between the spindle 6, and the extension 7, will assist in avoiding any of these undue strains.

The tendency of talking machine motor manufacturers at the present time is to direct their attention to the minor defects and improve the details of the already standardized motor. Production of talking machines during the last few years has been a somewhat complicated business matter. The manufacture of the motor and metal parts has been confined to one factory while the manufacture of the cabinet is delegated to an entirely different factory. And still a third party procures his motors in one place and his cabinets in another place; his business being solely that of an assembler of manufactured parts. It thus becomes necessary to provide motors of a character to meet the requirements of the different cabinet manufacturers and assembly companies, and the present invention is but one of a series of steps in that direction.

I claim:

1. A winding spindle for spring motors comprising a main shaft section and an extension section, there being a universal joint connection between the sections thereof, a screw thread on said extension section, and a removable section carrying a crank, a screw threaded bore in said section coöperating with the screw threaded portion of the extension section to actuate the mechanism.

2. A winding spindle for spring motors comprising a main shaft section and an extension section, there being a universal joint connection between the sections thereof, in combination with means for holding said sections in normal axial alinement, a screw thread on said extension section and a removable section carrying a crank, a screw threaded bore in said section coöperating with the screw threaded portion of the extension section to actuate the mechanism.

3. A winding spindle for spring motors comprising a main section and a removable operating extension section, with a universal joint connection between said sections, a screw thread on said extension section, and a removable section carrying a crank, a screw threaded bore in said section coöperating with the screw threaded portion of the extension section to actuate the mechanism.

4. A winding spindle for spring motors comprising a main section having an axial socket in one end thereof, and an extension section having a spherical head thereon, said head being pivoted within said socket, there being a slot in the head, a spring within said socket bearing upon said head for resiliently holding said sections in normal axial alinement, a screw thread on said extension section and a removable section carrying a crank, a screw threaded bore in said section coöperating with the screw threaded portion of the extension section to actuate the mechanism.

5. In a winding spindle for spring motors, the combination of a main spindle section having a cylindrical socket in the free end thereof, with an extension section pivotally connected with said main section within said socket, resilient means within said socket for holding said extension section in the outer end of said socket, a screw thread on said extension section and a removable section carrying a crank, a screw threaded bore in said section coöperating with the screw threaded portion of the extension section to actuate the mechanism.

6. A winding spindle for spring motors, having a main spindle section, there being a socket within one end of the section, an extension section, a ball on the end of said section, said ball resting within the socket, there being a slot in the ball, a pin passing through the slot to retain the ball in the socket, one side of the ball being flattened, a cup within the socket and resting against the flattened surface, a spring engaging the cup with the ball, and a removable section carrying a crank.

7. A winding spindle for spring motors, having a main spindle section, there being a socket within one end of the section, an extension section, a ball on the end of said section, said ball resting within the socket, there being a slot in the ball, a pin passing through the slot to retain the ball in the socket, a spring with the socket engaging the ball for resiliently holding the extension section in the extremity of the socket and in normal axial alinement with the main spindle section, and a removable section carrying a crank.

8. A winding spindle for spring motors comprising a main shaft section and an extension section, there being a universal joint connection between the sections thereof, a screw thread on said extension section, a short blunt stud on the screw threaded extension adapted to engage the bottom of the bore of the crank, and a removable section carrying a crank, a screw threaded bore in said section coöperating with the screw threaded portion of the extension section to actuate the mechanism.

9. A winding spindle for spring motors comprising a main shaft section and an extension section, there being a universal joint connection between the sections thereof, in combination with means for holding said sections in normal axial alinement, a screw thread on said extension section, a short blunt stud on the screw threaded extension adapted to engage the bottom of the bore of the crank and a removable section carrying a crank, a screw threaded bore in said section coöperating with the screw threaded portion of the extension section to actuate the mechanism.

10. A winding spindle for spring motors comprising a main section and a removable operating extension section, with a universal joint connection between said sections, a screw thread on said extension section, a short blunt stud on the screw threaded extension adapted to engage the bottom of the bore of the crank, and a removable section carrying a crank, a screw threaded bore in said section coöperating with the screw threaded portion of the extension section to actuate the mechanism.

11. In a winding spindle for spring motors, the combination of a main spindle section having a cylindrical socket in the free end thereof, with an extension section pivotally connected with said main section within said socket, resilient means within said socket for holding said extension section in the outer end of said socket, a screw thread on said extension section, a short blunt stud on the screw threaded extension adapted to engage the bottom of the bore of the crank, and a removable section carrying a crank, a screw threaded bore in said section coöperating with the screw threaded portion of the extension section to actuate the mechanism.

12. A winding spindle for spring motors comprising a main shaft section and an extension section, there being a universal joint between the sections thereof, a removable section carrying a crank, means on the extension section for engaging the crank and means on the crank section coöperating with the means on the extension section to actuate the mechanism.

PLINY CATUCCI.

Copies of this patent may be obtained for five cents each, by addressing the "Commissioner of Patents, Washington, D. C."